(12) United States Patent
Ali

(10) Patent No.: US 7,877,228 B2
(45) Date of Patent: Jan. 25, 2011

(54) METHOD AND SYSTEM FOR DETECTING ARTIFACTS IN ICU PATIENT RECORDS BY DATA FUSION AND HYPOTHESIS TESTING

(75) Inventor: Walid Ali, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1092 days.

(21) Appl. No.: 10/597,309

(22) PCT Filed: Feb. 1, 2005

(86) PCT No.: PCT/IB2005/050417

§ 371 (c)(1),
(2), (4) Date: Jul. 20, 2006

(87) PCT Pub. No.: WO2005/076187

PCT Pub. Date: Aug. 18, 2005

(65) Prior Publication Data

US 2008/0234973 A1 Sep. 25, 2008

Related U.S. Application Data

(60) Provisional application No. 60/541,688, filed on Feb. 4, 2004.

(51) Int. Cl.
*G06F 17/15* (2006.01)
(52) U.S. Cl. ............................ 702/179; 702/19; 702/23; 702/182; 702/183; 600/509; 600/513; 600/508; 600/407; 600/481; 128/668; 128/693; 128/694; 128/734

(58) Field of Classification Search .................. 702/19, 702/69, 71–74, 1, 66, 67, 124, 128, 179–183, 702/23; 706/45–61; 600/509, 382, 513, 600/508, 517, 516, 500, 483, 485, 336, 504, 600/481, 523, 544, 300, 301, 407; 607/60, 607/32; 128/668, 734, 691, 692, 693, 694
See application file for complete search history.

(56) References Cited

U.S. PATENT DOCUMENTS 5,339,822 A 8/1994 Taylor
5,810,014 A * 9/1998 Davis et al. .................. 600/508

(Continued)

OTHER PUBLICATIONS

Thakor, N., A. Natarajan and G. Tomaselli, Multiway Sequential Hypothesis Testing for Tachyarrhythmia Discrimination, IEEE Transactions on Biomedical Engineering, vol. 41, No. 2, pp. 480-487 (1994).*

(Continued)

*Primary Examiner*—Carol S Tsai

(57) ABSTRACT

A method for monitoring a patient employs hypothesis testing against each of several monitored signals to determine whether an artifact is present in the monitored signals. In the hypothesis testing, a null hypothesis includes an assumption that pairs of samples of highly correlated monitored signals of the several monitored signals have a predetermined distribution. The method determines that an artifact may exist in one of the monitored signals when the likelihood that the null hypothesis is true falls below a predetermined confidence value. This method can be embodied in an intelligent module for processing multiple data from one or more patients to filter out clinically significant changes in the patient from those changes caused by artifacts.

20 Claims, 4 Drawing Sheets

U.S. PATENT DOCUMENTS

| | | | | |
|---|---|---|---|---|
| 5,830,150 | A | * | 11/1998 | Palmer et al. ............... 600/523 |
| 5,902,249 | A | * | 5/1999 | Lyster ....................... 600/509 |
| 6,091,361 | A | * | 7/2000 | Davis et al. ................. 342/378 |
| 6,287,328 | B1 | | 9/2001 | Snyder |
| 6,600,776 | B1 | * | 7/2003 | Alamouti et al. ............ 375/147 |
| 6,821,249 | B2 | * | 11/2004 | Casscells et al. ............ 600/300 |
| 2003/0095304 | A1 | * | 5/2003 | Dorring et al. .............. 359/110 |
| 2003/0097439 | A1 | * | 5/2003 | Strayer et al. ............... 709/224 |
| 2003/0109990 | A1 | * | 6/2003 | Axelsson .................... 702/27 |
| 2003/0216654 | A1 | * | 11/2003 | Xu et al. ..................... 600/509 |
| 2003/0229289 | A1 | * | 12/2003 | Mohler et al. ............... 600/508 |
| 2004/0010375 | A1 | * | 1/2004 | Schomacker et al. ......... 702/19 |

OTHER PUBLICATIONS

Zong, W. et al. "Reduction of false arterial blook pressure alarms using signal quality assessment and relationships between the electrocardiogram and arterial blood pressure". Computers in Cardiology, 1999 Hannover, Germany.

Tsien C.L. et al. "Multiple signal integration by decision tree induction to detect artifacts in the neonatal intensive care unit", Artificial Intelligence in Medicine, vol. 19, No. 3, Jul. 2000.

Ali W. et al., "Identifying artifacts in arterial blook pressure using morphogram variability" Computers in Cardiology, 2004 Chicago, IL.

Ali W. et al., "Morphograms: exploiting correlation patterns to efficiently identify clinically significant events in intensive care units", San Francisco, CA 2004.

* cited by examiner

METHOD AND SYSTEM FOR DETECTING ARTIFACTS IN ICU PATIENT RECORDS BY DATA FUSION AND HYPOTHESIS TESTING

The present invention relates generally to expert systems, and more particularly to an expert system for use in evaluating data from a patient.

Healthcare technology (e.g., biomedical sensors, monitoring systems and medical devices) is rapidly advancing in capability as well as sheer prevalence (numbers of devices) in the modern intensive care unit (ICU). The creation of additional data streams is imposing a significant "information-overload" challenge upon healthcare staff that also faces a critical shortage of intensive care staff to meet the needs of the ICU patient population.

The present invention is therefore directed to the problem of developing a method and apparatus for reducing the amount of information that must be processed manually in an intensive care environment or other healthcare environment.

The present invention solves this and other problems by providing a method and apparatus composed of intelligent modules, which are capable of assimilating multiple data streams originating from a broad array of sensors and systems and able to distinguish clinically-significant changes in patient states from clinically-insignificant changes or artifacts.

According to one aspect of the present invention, an exemplary embodiment of a method for monitoring a patient includes employing hypothesis testing against each of several monitored signals to determine whether an artifact is present in the monitored signals. In the hypothesis testing, a null hypothesis includes an assumption that pairs of samples of highly correlated monitored signals of the several monitored signals have a predetermined distribution. The exemplary embodiment of the method then determines that an artifact may exist in one of the plurality of monitored signals when a likelihood that the null hypothesis is true falls below a predetermined confidence level. In general, the hypothesis test indicates whether the data being obtained matches historical data from patients with similar conditions. The data being matched includes pairs of samples of monitored signals against historical versions of the same monitored signals, which pairs are highly correlated monitored signals.

According to another aspect of the present invention, an exemplary embodiment of a method for detecting an artifact in one or more samples ($s_1 \ldots s_n$) of monitored signals ($S_1 \ldots S_n$) includes: calculating, for each ($s_m$) of the one or more samples ($s_1 \ldots s_n$) of monitored signals ($S_1 \ldots S_n$), a cross probability ($p_{mk}$) of observing each sample ($s_m$) and another sample ($s_k$) assuming a null hypothesis is true, wherein the null hypothesis ($H_0$) is that each sample ($s_m$) and each other sample ($s_k$) have the same distribution as stored versions; calculating a confidence ($c_{mk}$) level associated with each of the cross probabilities ($p_{mk}$); repeating the calculating steps for all combinations of pairs of highly correlated monitored signals; summing, for each sample ($s_m$), all of the cross probabilities ($p_{mk}$) associated with a pair of highly correlated signals ($S_{mk}$) that includes the sample ($s_m$); and outputting a result for each sample ($s_m$) as a probability of not including an artifact in each sample, wherein if one or more of these probabilities of not including an artifact lies below a predetermined threshold indicating to a user that one or more samples associated with one or more of the probabilities may include an artifact.

According to another aspect of the present invention, an exemplary embodiment of an apparatus for monitoring a patient includes multiple leads, a memory and a processor. Each of the leads receives a sample of a monitored signal. The memory stores each of the received samples of the monitored signals. The processor is coupled to the memory and is programmed to: employ hypothesis testing against each monitored signal to determine whether an artifact is present in the monitored signals, in which a null hypothesis includes an assumption that pairs of samples of highly correlated monitored signals of the monitored signals have a predetermined distribution; and determine that an artifact may exist in one of the monitored signals when a likelihood that the null hypothesis is true falls below a predetermined confidence level. The apparatus may include a user interface to output this information to a user in a meaningful manner.

According to yet another aspect of the present invention, the methods herein may be encoded in computer readable media as instructions for a processor.

Other aspects of the invention will be apparent to those of skill in the art upon review of the detailed description in light of the following drawings.

Any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides inter alia a method for using a system composed of intelligent modules, which are capable of assimilating multiple data streams originating from a broad array of sensors and systems and are able to distinguish clinically-significant changes in patient states versus clinically-insignificant ones or artifacts. The present invention includes a method for data stream fusion, which will enable multi-parameter monitoring capabilities.

According to one aspect of the present invention, the present invention also includes a method for detecting artifacts in a given monitored signal (or a set of monitored signals) based on statistical analysis. Hypothesis testing can be used to determine whether the monitored signal is the result of an artifact or a significant clinical change. A hypothesis test is a procedure for determining whether an assertion about a certain population characteristic is statistically reasonable.

According to one aspect of the present invention, hypothesis testing can be used to determine whether one or more artifacts are present in recently obtained data. For example, recently obtained data is hypothesized to have a distribution that follows the distribution of similar data obtained over a long term period of time (or across many patients). If the hypothesis turns out to be true (within some confidence interval), then the recently obtained data is more likely not to contain artifacts, whereas if the hypothesis is not true, then the converse is more likely. By employing highly correlated signals in pairs as the basis for the hypothesis test, increasing confidence can be obtained in the result.

Figure 1:
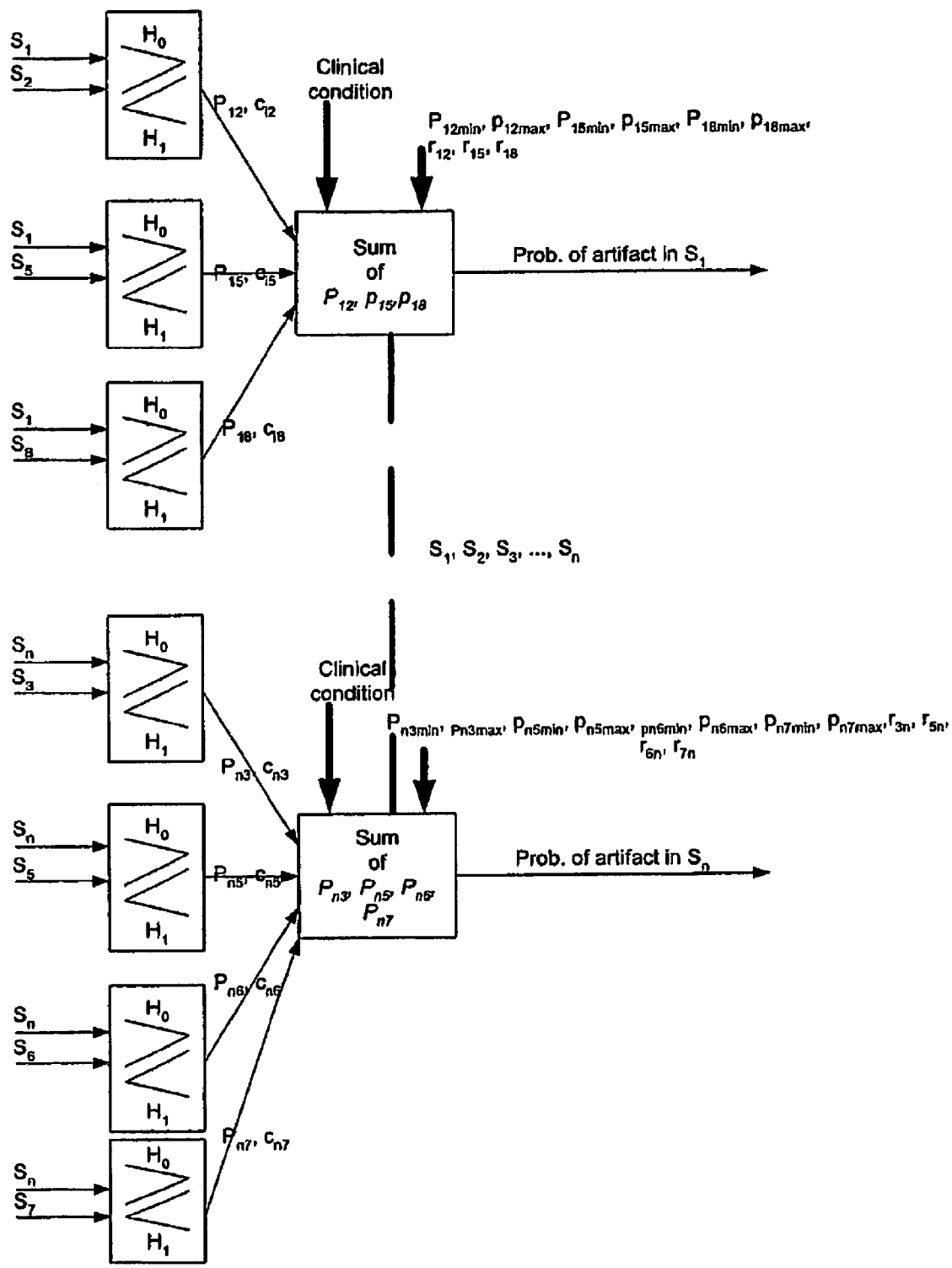
FIG. 1 depicts a block diagram of an exemplary embodiment of a method for processing multiple data streams according to one aspect of the present invention.

Assume there are a number of monitored signals ($S_1$, $S_2$, $S_3$, ..., $S_n$), for which one needs to have an indicator for the presence of artifacts in every signal. The process starts by running off-line correlation testing among recorded banks of these signals. ECG/EEG signal database sources are publicly available and can be easily obtained. The resulting correlation matrix gives an indicator of the cross dependency between every pair of these signals and would be of the form:

$$\begin{bmatrix} r_{11} & \cdots & r_{1n} \\ \vdots & & \vdots \\ r_{n1} & \cdots & r_{nn} \end{bmatrix} \quad (1)$$

where $r_{11}$ is the autocorrelation of signal $S_1$ with itself ($r_{11}=1$) and $r_{1n}$ is the cross correlation between signals $S_1$ and $S_n$. These cross correlation values are needed for the statistical analysis as shown in FIG. 1. The National Institutes of Health have developed such a database from which these cross-correlation values can be obtained.

Hypothesis testing (Null Hypothesis testing with a predefined significance level, i.e. confidence interval) is used for determining the probability of the presence of artifacts. A hypothesis test is a procedure for determining if an assertion about a characteristic of a population is reasonable. The null hypothesis is the original assertion. In this case, the null hypothesis is that the signals under study have the same distribution H0 as the database of similar signals.

The alternative hypothesis is that the signals under study do not belong to the same population H1 as the database of similar signals.

The significance level is related to the degree of certainty required to reject the null hypothesis in favor of the alternative. By taking a small sample one cannot be certain about one's conclusion. In fact, the smaller the sample the less certain one can be about the relationship of the data to a distribution of other data. For example, a single data point obtained if several standard deviations from the mean of a sample of similar data could either be a statistical anomaly (i.e., the data is valid but just represents a point that has a very small likelihood of occurring, but nevertheless can still occur) or could be an artifact. However, as the number of data points increases the confidence with which one can state that the data is anomalous or based on artifacts increases as the likelihood of several data points being significantly outside the main distribution becomes increasingly unlikely.

So one must decide in advance to reject the null hypothesis if the probability of observing a sampled result is less than the significance level. Many researchers employ a significance level of about five percent. For a typical significance level of five percent (5%), the notation is $\alpha=0.05$. For this significance level, the probability of incorrectly rejecting the null hypothesis when it is actually true is 5%. For more protection from this error, a lower value of $\alpha$ should be selected.

The p-value is the probability of observing the given sample result under the assumption that the null hypothesis is true. If the p-value is less than $\alpha$, then the null hypothesis should be rejected. For example, if $\alpha=0.05$ and the p-value is 0.03, then the null hypothesis is rejected. The converse is not true. If the p-value is greater than $\alpha$, then one has insufficient evidence to reject the null hypothesis.

The outputs for many hypothesis test functions also include confidence intervals. As the term is used herein, a confidence interval is a range of values that have a chosen probability of containing the true hypothesized quantity. Suppose, in the foregoing example, the sampled value is inside a 95% confidence interval for the mean, $\mu$. This is equivalent to being unable to reject the null hypothesis at a significance level of 0.05. Conversely, if the $100(1-\alpha)$ confidence interval does not contain include the p-value, then one rejects the null hypothesis at the $\alpha$ level of significance.

Based on prior testing of the monitored signals under study ($S_1$, $S_2$, $S_3$, ..., $S_n$) as stored in the databanks, and identifying correlated signals as in equation (1), we set a certain threshold to determine the accepted level of correlation (e.g., reject any correlation factor $r_{ij}$ less than 40%). We repeat the same experiment (which results in a different correlation matrix) for every clinical condition under examination (e.g., angina, bleeding, brain injury, pulmonary edema, cord compression, metabolic coma, respiratory failure, ..., etc). Each clinical condition will have its own correlation matrix, which describes the success of having any two signals pass hypothesis testing when compared against each other. For example, as shown in FIG. 1, signals $S_1$ and $S_2$ have a certain correlation factor $r_{12}$, and a certain range of p-values (e.g., $p_{minAngina}$, $p_{maxAngina}$) in the case of angina, which is different from the case of respiratory failure. The closer the currently produced values from the normal range, the higher the corresponding weight it has. This is measured by assigning more weight to the p values closer to the nominal ones. For example, $$p_{i,j} = \frac{p_{i,j} - 0.5(p_{i,jmax\ Angina} + p_{i,jmin\ Angina})}{(p_{i,jmax\ Angina} - p_{i,jmin\ Angina})} \times c_{i,j} \quad (2)$$

where $c_{ij}$ is a confidence factor (1-cumulative distribution).

Summing these individual values, the probability that the signal under study has no artifacts in it is:

$$p_{no\ artifacts\ in\ signal\ i} = \sum_j p_{i,j} \quad (3)$$

Where the sum j is over all the signals that highly correlate with signal i. Obviously, the probability of having artifacts in signal i is $(1-P_{no\ artifacts\ in\ signal\ i})$. FIG. 1 shows a block diagram of the above described process.

Figure 2:
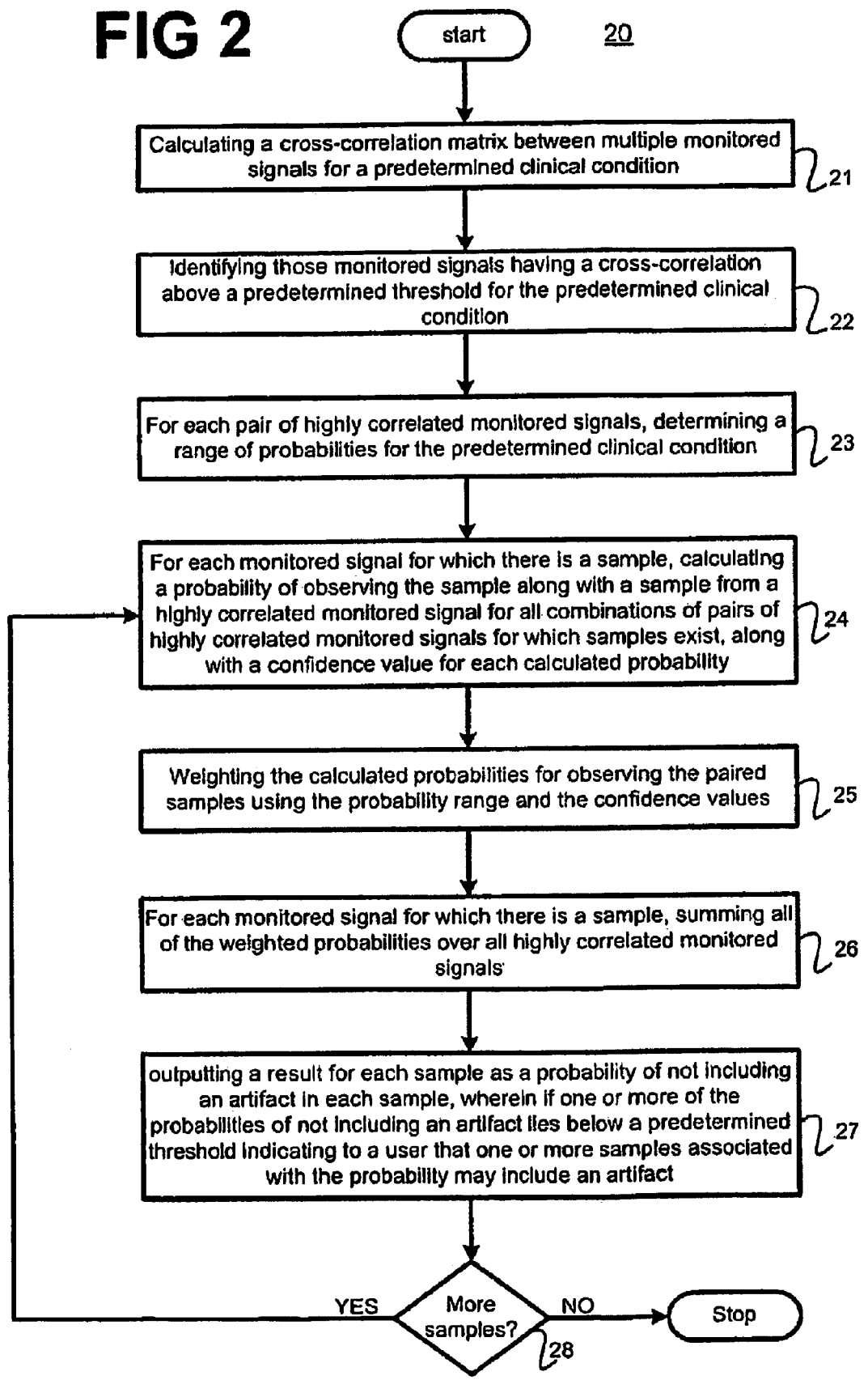
FIG. 2 depicts a flow chart of an exemplary embodiment of a method for monitoring a patient according to yet another aspect of the present invention.

Turning to FIG. 2, shown therein is an exemplary embodiment of a method for determining whether an artifact is present in monitored signals obtained from a patient being treated or observed for a specific clinical condition. For example, the monitored signals could be electrocardiograms, respiration rates, heart rates, or other signals that provide information as to a patient's health. This method enables a medical clinician or operator to focus on those aspects of the patient that include clinically significant changes as opposed to artifacts, which need to be addressed differently. In the case of artifacts, the signal leads need to be checked to verify data integrity, which can be accomplished by a technician, for example. In the case of a clinically significant change, a physician or specialist may be required to review the data to determine the appropriate response.

In step 21, a cross-correlation matrix as follows $$\begin{bmatrix} r_{11} & \cdots & r_{1n} \\ \vdots & & \vdots \\ r_{n1} & \cdots & r_{nn} \end{bmatrix}$$

is calculated for the monitored signals. The cross-correlation matrix can be obtained from a database of the monitored signals obtained from patients under similar clinical conditions. This matrix quantitatively describes the relationship or correlation between the monitored signals. Thus, $r_{ij}$ quantifies the cross-correlation between two monitored signals ($S_i$ and $S_j$). For example, $r_{11}$ represents the correlation between a signal ($S_1$) and itself, which is one. This matrix may vary from clinical condition to clinical condition; therefore each cross-correlation matrix should be obtained from stored monitored signals that were observed from a multitude of patients having the same clinical condition.

In step 22, those pairs of signals that are highly correlated are identified. For example, every value in the matrix above 0.40 or 40% indicates two signals that are highly correlated. In this case, those signals that have cross-correlation values above this predetermined threshold, such as 40%, are identified as highly correlated. These pairs of signals can be used to authenticate the data, as signals that are highly correlated should have samples that are similarly correlated. If not, then the likelihood increases that the samples are tainted.

In step 23, the maximum and minimum probability values are determined from the database for each cross-correlated pair. For example, the minimum value for observing both signals is identified from the database and the maximum value as well.

In step 24, for each monitored signal ($S_1$) for which a sample ($s_1$) exists (the sample of interest), a probability ($p_{ij}$) of observing the sample ($s_i$) of the monitored signal ($S_i$) along with a sample ($s_j$) from one of the highly correlated monitored signals ($S_i$) is determined. These probabilities ($p_{ij}$ ... $p_{ik}$) are determined for every highly correlated signal (for which there is a sample) for the given sample of interest. For example, if signals $S_2$, $S_5$ and $S_8$ (as shown in FIG. 1) were highly correlated with respect to signal $S_1$, then the cross-probabilities $p_{12}$, $p_{15}$ and $p_{18}$ are determined. The associated confidence value ($c_{ij}$) is also determined for each determined probability, which in this case are $c_{12}$, $c_{15}$ and $c_{18}$. The probability of two samples of the monitored signals being observed is calculated under the assumption that the two samples have the same and predetermined probability distribution. For example, a probability of observing a first ten minute sample of a first signal, such as a ECG I lead signal, and a second ten minute sample of a second signal, such as a ECG II lead signal, is calculated assuming the first and second samples follow a predetermined population distribution (such as a normal distribution or the same distribution as the database of monitored signals). This can be accomplished using the Kolmogorov-Smirnov test, which tests the null hypothesis that the population distribution from which the paired data sample is drawn conforms to a hypothesized distribution. If the null hypothesis is true as determined by the chosen hypothesis test, a probability is generated for observing the data samples, along with an associated confidence value or interval. If the null hypothesis is not likely to be true based on the hypothesis test, then the sample may be tainted with an artifact.

In step 25, the calculated probabilities are then weighted using the range of probabilities for the given medical condition. The end result is the probability of the sample not having an artifact. The probability of the sample having an artifact is simply one minus this probability.

In step 26, the weighted probabilities are summed over all highly correlated signals for a given sample.

In step 27, a result is output for each sample as a probability of not including an artifact in each sample. If one or more of the probabilities of not including an artifact lies below a predetermined threshold, a user is informed that one or more samples associated with the probability may include an artifact.

In step 28, the determination is made if more data exists, in which case the above process is repeated continuously as long as new samples exist.

Figure 3:
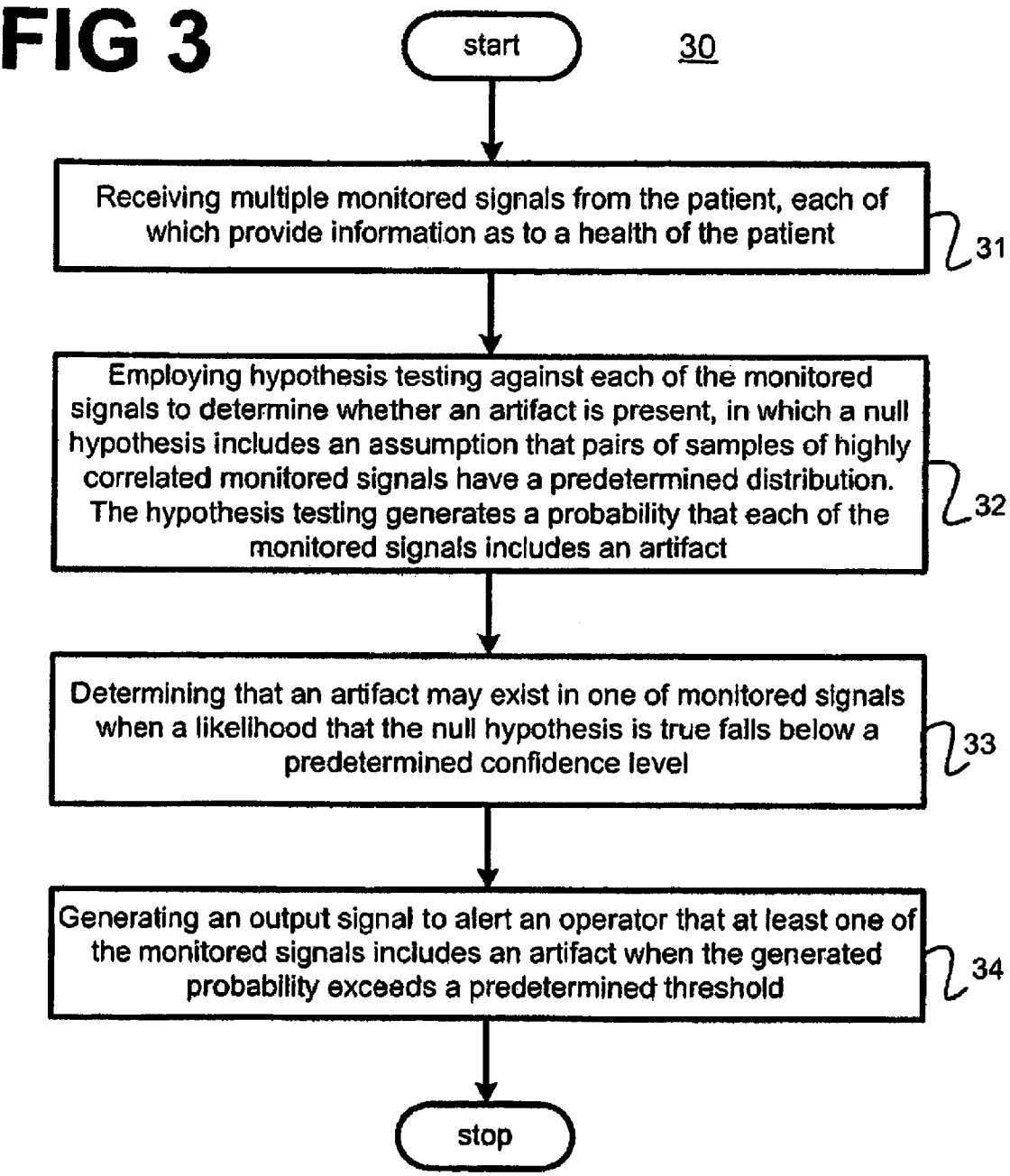
FIG. 3 depicts a flow chart of another exemplary embodiment of a method for monitoring a patient according to still another aspect of the present invention.

Turning to FIG. 3, shown therein is another exemplary embodiment of a method for monitoring a patient according to another aspect of the present invention.

In step 31, several monitored signals are received from the patient, each of which provides information as to the health of the patient. These signals can be EEG signals, ECG signals, ABP signals, respiration signals, brainwaves, etc.

In step 32, hypothesis testing is employed against each of several monitored signals to determine whether an artifact is present in the monitored signals. In the hypothesis testing, a null hypothesis includes an assumption that pairs of samples of highly correlated monitored signals of the several monitored signals have a predetermined distribution. The predetermined distribution may include the same distribution as corresponding pairs of stored versions of the monitored signals or some standard probability distribution, such as a Gaussian distribution. The hypothesis testing will generate a probability that each of the monitored signals includes an artifact.

In step 33, it is determined that an artifact may exist in one of the several monitored signals when a likelihood that the null hypothesis is true falls below a predetermined confidence level.

In step 34, an output signal is generated to alert an operator that at least one of the monitored signals includes an artifact when the probability generated in step 32 exceeds a predetermined threshold.

Figure 4:
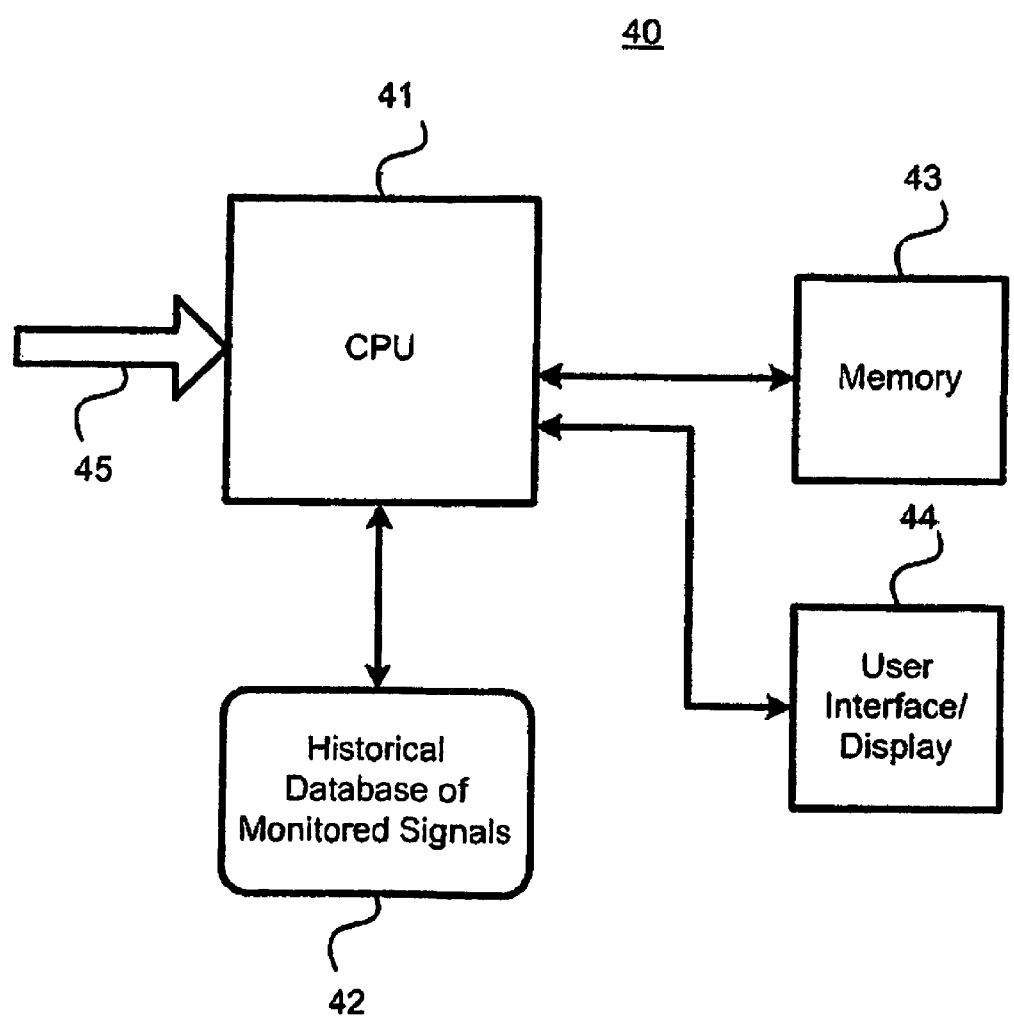
FIG. 4 depicts a block diagram of an apparatus for monitoring a patient according to still another aspect of the present invention.

Turning to FIG. 4, shown therein is an apparatus for processing data being received from a patient being monitored for a medical condition. The apparatus can be part of a system of intelligent modules, each of which processes information from the patient so that a clinician or physician can be instantly notified or alerted as to a change in a clinical condition of the patient being monitored.

A processor 41 performs the above mentioned methods to identify the presence of artifacts in the data from the patient. Other modules may identify a clinically significant change, and the identification of an artifact being present in the data can be used to filter out changes caused by artifacts and changes caused by changes in the condition of the patient. Any processor capable of performing matrix manipulations of thousands of samples should be sufficient to carry out the methods set forth herein. One possible processor includes the Intel Pentium processor.

One or more leads 45 transmit the samples to the CPU 41. These leads can be standard ECG leads or a communication system that forwards data from a patient to a central processing section for further processing. These leads could be wireless or wired. In the case of wireless, the leads could be a single or multiple antennae. In the case of wired leads, the leads could be a single lead that carries multiple signals or a single lead for each sample.

A memory 43 stores any information necessary for the processor 41. For example, memory 43 can be a computer readable media that has encoded thereon instructions for programming the processor 41. Memory 43 can also be a database that stores all incoming samples for subsequent processing by the processor 41 so that samples can be accumulated while the processor 41 is evaluating prior samples. The memory 43 stores these samples so that the processor can reuse them for fine-tuning its analysis by, e.g., using more and more data during each iteration to better evaluate the incoming samples. A memory of 50 gigabytes should be sufficient for this purpose. Memory 43 can be random access memory or other memory in which data can be written to as well as read from.

The CPU 41 is shown coupled to a database 42 that stores historical versions of the monitored signals of interest. This coupling can be in the form of an actual communications connection so that in real time the CPU 41 can obtain the desired parameters discussed above. Alternatively, this coupling can be figurative in that the desired parameters are obtained from the database 42 and then programmed in the processor or stored in the memory 43. An example of this database is being developed by NIH, as mentioned above.

A user interface 44 is coupled to the processor 41 so that an operator can be informed if an artifact is present in the samples being received from the patient. The operator can be shown the calculated probabilities, as well as the associated confidence levels. Moreover, an alert can be generated when an artifact is detected, which alert can be in the form of a audio or visual indicator.

It will be appreciated that modifications and variations of the invention are covered by the above teachings and are within the purview of the appended claims without departing from the spirit and intended scope of the invention. While the above embodiments discuss certain weighting technique for weighting the various probabilities prior to summing them, other weighting techniques could be employed as well. Moreover, while the above embodiments describe certain hypothesis tests, other hypothesis tests could be used. Furthermore, these examples should not be interpreted to limit the modifications and variations of the invention covered by the claims but are merely illustrative of possible variations.

The invention claimed is:

1. A method for monitoring a patient comprising:
    receiving a plurality of monitored signals carried on leads from the patient, each of the monitored signals providing information as to health of the patient;
    employing hypothesis testing against each of the plurality of monitored signals to determine whether an artifact is present in the plurality of monitored signals, in which a null hypothesis includes an assumption that pairs of samples of correlated monitored signals of the plurality of monitored signals have a predetermined distribution, the predetermined distribution including the same distribution as corresponding pairs of stored versions of the plurality of monitored signals;
    determining that an artifact may exist in one of the plurality of monitored signals when a likelihood that the null hypothesis is true falls below a predetermined confidence level; and
    in response to the likelihood falling below the predetermined confidence level, generating an alert on a user interface device.

2. The method according to claim 1, wherein the hypothesis testing includes generating a probability that each of the monitored signals includes an artifact.

3. The method according to claim 2, wherein generating the alert includes:
    generating an artifact alert that at least one of the monitored signals includes an artifact on the user interface when the generated probability exceeds a predetermined threshold.

4. A non-transient computer readable medium carrying software which controls a processor to perform the method according to claim 1.

5. An apparatus for detecting an artifact in one or more samples ($s_1 \ldots s_n$) of a plurality of monitored signals ($S_1 \ldots S_n$) comprising:
    one or more leads which carry the one or more samples ($s_1 \ldots s_n$) of the plurality of monitored signals from a patient;
    a processor programmed to perform the method according to claim 1.

6. A method for detecting an artifact comprising:
    receiving one or more samples ($s_1 \ldots s_n$) of a plurality of monitored signals ($S_1 \ldots S_n$) carried on leads from a patient:
    calculating, for each ($s_m$) of the one or more samples ($s_1 \ldots s_n$) of the plurality of monitored signals ($S_1 \ldots S_n$), a cross probability ($p_{mk}$) of observing the sample ($s_m$) and another sample ($s_k$) assuming a null hypothesis is true, wherein the null hypothesis ($H_0$) is that the sample ($s_m$) and the other sample ($s_k$) have a same distribution as a stored version of the sample ($s_m$) of the plurality of monitored signals;
    weighting each of the calculated cross probabilities so that samples being closer to a norm have a larger weight;
    calculating a confidence ($c_{mk}$) level associated with each of the cross probabilities ($p_{mk}$);
    repeating the calculating steps for all combinations of pairs of highly correlated monitored signals of the plurality of monitored signals;
    summing, for each sample ($s_m$), all of the cross probabilities ($p_{mk}$) associated with a pair of correlated signals ($S_{mk}$) that includes the sample ($s_m$); and
    on a user interface device, outputting a result for each sample ($s_m$) as a probability of not including an artifact in the sample, wherein if one or more of the probabilities of not including an artifact lies below a predetermined threshold, then indicating on the user interface that one or more samples associated with one or more of the probabilities may include an artifact.

7. The method according to claim 6, further comprising:
    calculating a correlation matrix for the plurality of monitored signals ($S_1 \ldots S_n$) from a database of a plurality of stored monitored signals as follows:

$$\begin{bmatrix} r_{11} & \cdots & r_{1n} \\ \vdots & & \vdots \\ r_{n1} & \cdots & r_{nn} \end{bmatrix}$$

wherein r11 is an autocorrelation of a first monitored signal ($S_1$) of the plurality of monitored signals ($S_1 \ldots S_n$) with itself ($r_{11}=1$) and $r_{1n}$ is a cross correlation between the first monitored signal ($S_1$) of the plurality of monitored signals ($S_1 \ldots S_n$) and another monitored signal ($S_n$) of the plurality of monitored signals ($S_1 \ldots S_n$).

8. The method according to claim 7, further comprising:
    identifying one or more pairs of highly correlated monitored signals among the plurality of monitored signals by determining which one or more pairs of monitored signals have a cross correlation that exceeds a predetermined threshold.

9. The method according to claim 6, further comprising determining a range of cross probabilities of the plurality of stored monitored signals for a given clinical condition, wherein the weighting includes:

weighting each of the calculated cross probabilities ($p_{mk}$) as follows:

$$p_{mk} = \frac{p_{mk} - \left(\dfrac{p_{mk\ max\ specific\ clinical\ condition} + p_{mk\ min\ specific\ clinical\ condition}}{2}\right)}{(p_{mk\ max\ specific\ clinical\ condition} - p_{mk\ min\ specific\ clinical\ condition})} \times c_{mk}$$

wherein:

$p_{mk\ max\ specific\ clinical\ condition}$ represents a maximum probability value from a stored version of a pair of monitored signals, and $p_{mk\ min\ specific\ clinical\ condition}$ represents a minimum probability value from a stored version of a pair of monitored signals.

10. A non-transitory computer readable medium carrying software which controls a processor to perform the method according to claim 6.

11. An apparatus for monitoring a patient comprising:
a plurality of leads which carry one or more samples ($s_1 \ldots s_n$) of a plurality of monitored signals ($S_1 \ldots S_n$) from a patient;
a processor programmed to perform the method according to claim 6.

12. A method for detecting an artifact comprising:
receiving a plurality of monitored signals ($S_1 \ldots S_n$) from one or more leads;
extracting one or more samples ($s_1 \ldots s_n$) of the plurality of monitored signals;
calculating, for each ($s_m$) of the one or more samples ($s_1 \ldots s_n$) of the plurality of monitored signals ($S_1 \ldots S_n$), a cross probability ($p_{mk}$) of observing each sample ($s_m$) and another sample ($s_k$) assuming a null hypothesis is true, wherein the null hypothesis is that a combined distribution of the sample ($s_m$) and the other sample ($s_k$) have a predetermined distribution;
calculating a confidence ($c_{mk}$) level associated with each of the cross probabilities ($p_{mk}$);
repeating the calculating steps for combinations of pairs of highly correlated monitored signals of the plurality of monitored signals;
summing, for each sample ($s_m$), a plurality of cross probabilities ($p_{mk}$) associated with a plurality of pairs of highly correlated signals ($S_{mk}$), each of which includes a sample ($s_m$);
outputting for each sample a result, wherein the result is obtained by subtracting the sum from one for each sample ($s_m$), as a probability of including an artifact in each sample; and
on a display device, generating a display which indicates to an operator of the monitoring system, if one or more of the probabilities of including an artifact exceeds a predetermined threshold, then one or more samples associated with the one or more probabilities above the predetermined threshold may include an artifact.

13. The method according to claim 12, further comprising:
continuously performing the calculating, summing and subtracting on a periodic basis as long as signals are being received from a patient.

14. An apparatus for monitoring a patient comprising:
a plurality of leads, which carry a plurality of monitored signals from a patient, each of the monitored signals providing health information as to health of the patient;
a processor programmed to:
receive the plurality of signals carried on the leads from the patient,
employ hypothesis testing against each of the plurality of monitored signals to determine whether an artifact is present in the plurality of monitored signals, in which a null hypothesis includes an assumption that pairs of samples of correlated monitored signals of the plurality of monitored signals have a predetermined distribution, the predetermined distribution including the same distribution as corresponding pairs of stored versions of the plurality of monitored signals,
determine that an artifact may exist in one of the plurality of monitored signals when a likelihood that the null hypothesis is true falls below a predetermined confidence level, and
in response to the likelihood falling below the predetermined confidence level, generate an alert; and
a user interface device connected with the processor to present the alert.

15. The apparatus according to claim 14, further including:
a memory connected with at least one of the leads and the processor to store samples of the monitored signals.

16. The apparatus according to claim 14, further including:
a database which stores at least one of historical versions of the monitored signals and parameters of the historical versions of the monitored signals; and
wherein the predetermined distribution includes a distribution of one of corresponding pairs of samples of historical versions of the monitored signals and the parameters of the historical versions of the monitored signals.

17. An apparatus for detecting an artifact in one or more samples ($s_1 \ldots s_n$), of a plurality of monitored signals ($S_1 \ldots S_n$), comprising:
one or more leads coupled to receive one of the one or more samples ($s_1 \ldots s_n$) of the plurality of monitored signals ($S_1 \ldots S_n$);
a memory to store each of the received one or more samples of the plurality of monitored signals; and
a processor coupled to the memory and to the one or more leads and being programmed for:
calculating, for each ($s_m$) of the one or more samples ($s_1 \ldots s_n$) of the plurality of monitored signals ($S_1 \ldots S_n$) a cross probability ($p_{mk}$) of observing each sample ($s_m$) and another sample ($s_k$) assuming a null hypothesis is true, wherein the null hypothesis ($H_0$) is that the sample ($s_m$) and the other sample ($s_k$) have the same distribution as a stored version of the sample ($s_m$) of the plurality of monitored signals;
calculating a confidence level ($c_{mk}$) level associated with each of the cross probabilities ($p_{mk}$);
repeating the calculating steps for all combinations of pairs of correlated monitored signals of the plurality of monitored signals;
summing, for each sample ($s_m$), all of the cross probabilities ($p_{mk}$) associated with a pair of highly correlated signals ($S_{mk}$) that includes each sample ($s_m$); and
outputting a result for each sample ($s_m$)) as a probability of not including an artifact in the sample, wherein if one or more of the probabilities of not including an artifact lies below a predetermined threshold indicating to a user that one or more samples associated with one or more of the probabilities may include an artifact.

18. The apparatus according to claim 17, wherein the processor is further programmed for:
calculating a correlation matrix for the plurality of monitored signals ($S_1 \ldots S_n$) from a database of a plurality of stored monitored signals as follows:

$$\begin{bmatrix} r_{11} & \cdots & r_{1n} \\ \vdots & & \vdots \\ r_{n1} & \cdots & r_{nn} \end{bmatrix}$$

wherein $r_{11}$ is an autocorrelation of a first monitored signal ($S_1$) of the plurality of monitored signals ($S_1 \ldots S_n$) with itself ($r_{11}=1$) and $r_{1n}$ is a cross correlation between the first monitored signal ($S_1$) of the plurality of monitored signals ($S_1 \ldots S_n$) and another monitored signal ($S_n$) of the plurality of monitored signals ($S_1 \ldots S_n$).

19. The apparatus according to claim 18, wherein the processor is further programmed for:

identifying one or more pairs of highly correlated monitored signals among the plurality of monitored signals by determining which one or more pairs of monitored signals have a cross correlation that exceeds a predetermined threshold.

20. The apparatus according to claim 17, wherein the processor is further programmed for:

weighting each of the calculated cross probabilities so that samples being closer to a norm have a larger weight, and the weighting includes:

weighting each of the calculated cross probabilities ($p_{mk}$) as follows:

$$p_{mk} = \frac{p_{mk} - \left( \dfrac{p_{mk\ max\ specific\ clinical\ condition} + p_{mk\ min\ specific\ clinical\ condition}}{2} \right)/2}{(p_{mk\ max\ specific\ clinical\ condition} - p_{mk\ min\ specific\ clinical\ condition})} \times c_{mk}$$

wherein:

$p_{mk\ max\ specific\ clinical\ condition}$ represents a maximum probability value from a stored version of a pair of monitored signals, and $p_{mk\ min\ specific\ clinical\ condition}$ represents a minimum probability value from a stored version of a pair of monitored signals.

\* \* \* \* \*